(12) United States Patent
Anderson

(10) Patent No.: US 6,482,459 B1
(45) Date of Patent: Nov. 19, 2002

(54) METHOD FOR PROCESSING CORN GRIT AND PRODUCT

(75) Inventor: Brian J. Anderson, Marion, IL (US)

(73) Assignee: Bethel Grain Company L.L.C., Benton, IL (US)

( * ) Notice: Subject to any disclaimer, the term of this patent is extended or adjusted under 35 U.S.C. 154(b) by 0 days.

(21) Appl. No.: 10/066,863

(22) Filed: Feb. 4, 2002

(51) Int. Cl.$^7$ .................................................. A23L 1/00
(52) U.S. Cl. ....................... 426/516; 426/511; 426/463; 426/464; 426/622; 426/626
(58) Field of Search ................... 426/510, 511, 426/516, 463, 464, 618, 622, 626

(56) References Cited

U.S. PATENT DOCUMENTS 5,296,253 A * 3/1994 Lusas et al. ................. 426/618
5,447,742 A * 9/1995 Malvido et al. ............. 426/626
5,558,898 A * 9/1996 Sunderland .................. 426/626

* cited by examiner

Primary Examiner—George C. Yeung
(74) Attorney, Agent, or Firm—Olson & Hierl, Ltd.

(57) ABSTRACT

Corn grit is continuously processed to corn collects, or corn flour, by first treating the corn grit in a conditioner at a basic pH and a temperature in the range of about 180° F. to about 200° F. in the presence of steam and at a relatively low moisture content, i.e., no more than about 15 weight percent, preferably about 14 weight percent for a time period sufficient to effect partial gelatinization. Thereafter the obtained, partially gelatinized corn grit is passed through an extruder to produce corn collets that can be comminuted to corn flour. The corn grit moisture content in the extruder is about 20 to about 25 weight percent, and the corn collets are extruded at an exit temperature in the range of about 200 to 215° F. and a moisture content of about 9 to about 12 weight percent. The extruded corn collets have a dextrin value of about 8 to about 10.

12 Claims, 1 Drawing Sheet

METHOD FOR PROCESSING CORN GRIT AND PRODUCT

FIELD OF INVENTION

This invention relates to a continuous process for controlled hydrolysis of corn grit and to a product obtained therefrom.

BACKGROUND OF INVENTION

Kernels of corn contain naturally occurring starch, a polysaccharide constituted, in part, by amylose and amylopectin moieties. Upon heating under hydrolyzing conditions, these moieties deploymerize. This depolymerization is called gelatinization. When naturally occurring starch undergoes gelatinization, it tends to form a colloidal suspension in water that gels upon cooling. Starch that is partially or fully gelatinized is useful as a binder in various pelletization applications, e.g., iron ore pelletization, fertilizer pelletization, and the like, either alone or in combination with other polymeric materials.

Gelatinization of corn starch by heating whole kernels of corn is a lengthy process that is not cost efficient. A long time period is required for water to penetrate the pericarp or hull of the corn kernel.

Whole kernels of corn, or ground corn that has not been degerminated, contain floury endosperm and horny endosperm (also known as corn grit). Each type of endosperm, when cooked, ruptures and releases gelatinized starch at different rates. Because these two types of endosperm contribute gelatinized starch at different rates, it is difficult to control the amount of gelatinized starch that will be produced. If the corn particles are cooked long enough to have the horny endosperm contribute a significant portion of the overall gelatinized starch content of the ultimately produced corn flour, then the earlier released starch from the floury endosperm is over-gelatinized. If, however, the corn particles are cooked for a time period that does not result in the over-gelatinization of the starch from the floury endosperm, then the horny endosperm typically does not contribute enough gelatinized starch to the flour and is underutilized. As a result, product uniformity and quality assurance are difficult to achieve.

Yet another problem associated with the previously known processes for cooking whole kernels of corn is that this typically cannot be accomplished in a continuous process. Instead, batch processes are used, because it takes a relatively long time period to hydrate whole kernels of corn. Batch processes require the use of more than one production line, or a large number of holding tanks in which to hydrate the whole kernels of corn. Therefore, it would be desirable to use a continuous process because it requires a single production line and fewer pieces of equipment, which is a less costly process expedient than a batch process. The present invention satisfies this desire.

SUMMARY OF INVENTION

Corn collets having a basic pH value are produced in a continuous process by first conditioning corn grit (horny endosperm) at atmospheric pressure and at elevated temperature (about 180° F. to about 200° F.) with an aqueous sodium hydroxide solution in the presence of steam, and while maintaining a corn grit moisture content of no more than about 15 weight percent, preferably about 14 weight percent. The conditioning is carried out for a time period sufficient to partially gelatinize the corn grit to a gelatinization level in the range of about 5% to about 25%.

The partially gelatinized corn grit is then passed through an extruder at a superatmospheric pressure (usually about 1.1 atm to about 1.5 atm) and a temperature in the range of about 150° F. to about 210° F. while the corn grit moisture content is maintained in the range of about 20 to about 25 weight percent, preferably about 22 weight percent. Cooked corn grit in the form of corn collets are discharged from the extruder at an exit temperature in the range of about 200° F. to about 215° F. and at a moisture content in the range of about 9 to about 12 weight percent.

The corn collets are subsequently cooled to ambient temperature and dried to a moisture content of no more than about 9 weight percent, preferably below 9 weight percent.

If desired, the cooled and dried corn collets can be comminuted to a meal or flour, preferably a flour passing through a 100-mesh screen, U.S. Sieve Series.

DESCRIPTION OF PREFERRED EMBODIMENTS

Figure 1:
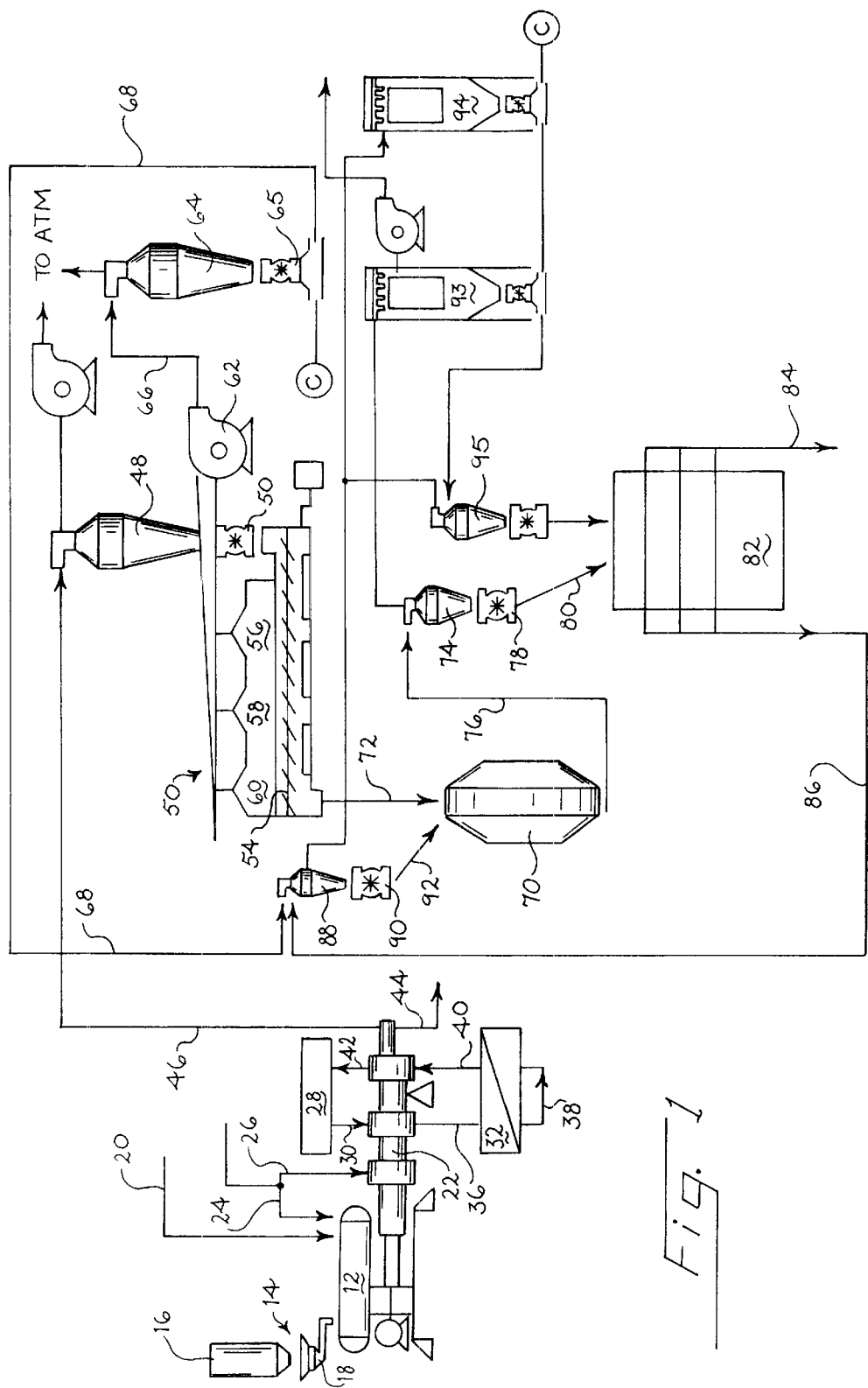
FIG. 1 is a schematic flow diagram that illustrates a continuous process embodying the present invention.

The starting material for the present continuous process is the horny endosperm portion of a corn kernel. The horny endosperm portion of each kernel of corn, also known as corn grit, is separated from the remainder of the corn kernel. The corn grit is then hydrated in a basic aqueous medium in a conditioner so as to raise the moisture level in the corn grit to a desired, but relatively low, level to form a hydrated corn grit. The hydrated corn grit is then cooked in an extruder at a temperature sufficiently high so as to rupture or partially rupture some of the hydrated corn meal particles which will contribute gelatinized starch to the produced corn collets, or to the corn flour produced by comminution of the corn collets. The corn grit may be ground before it is hydrated to form a corn meal of various particle sizes. Ground corn grit allows for even greater control over the amount of gelatinized starch produced.

The present continuous method allows efficient and effective control over the temperature and residence time of the different production stages so that the production speed and ultimate product characteristics can be readily controlled. The corn-derived flour obtained by comminution of the corn collets is useful as a binder for pelletizing inorganic or mineral materials such as fertilizers, ore concentrates, coal fines and the like.

Referring to FIG. 1, corn grit is fed to conditioner 12 at feed station 14 which includes feed bin 16 and feeder 18. Aqueous sodium hydroxide solution is supplied to conditioner 12 via line 20. Steam is supplied to conditioner 12 and to downstream extruder 22 by lines 24 and 26 as required to maintain temperature and a desired corn grit moisture level. Cooling water is supplied to extruder 22 from water source 28 via lines 30 and circulates around extruder 22 and through heat exchanger 32 through lines 36.

Extruded corn collets can be sent as finished product to storage through line 44, or for further processing into flour through line 46 to cyclone 48 and through air lock 50 to cooling and drying station 52 which is constituted by cooling screw 54 and a series of plenum chambers 56, 58 and 60 associated with exhaust fan 62. Moisture removed from the corn collets at cooling and drying station 50 is carried by the exhaust stream from fan 62 to cyclone 64 by line 66 and then vented to the atmosphere. Any fines recovered in cyclone 64 are passed through air lock 65 and recycled as a fluidized stream via line 68 for further processing, as will be discussed in greater detail hereinbelow.

Appropriately dried corn collets from cooling and drying station 50 are fed into hammermill 70 through line 70 for comminution into corn-derived flour which is transported to cyclone 74 via line 76 for size classification. The relatively heavier flour particles are transported from cyclone 74 through air lock 78 and line 80 to sifter 82. Corn-derived flour is recovered via line 82. Oversize flour particles are returned via line 86 to cyclone 88 for separation and reprocessing in hammermill 70. Cyclone 88 also receives fines from cyclone 64. The produced particulate admixture is classified in cyclone 88 into relatively coarser particles and relatively finer particles. The relatively coarser particles are passed through air lock 90 and through line 92 to hammermill 70 for further size reduction. The relatively finer particles (about 200 microns in size) collected in dust collector's 93 and 94, back to cyclone 95 and incorporated into final product.

The overall processing conditions are as follows. Conditioning in conditioner 12 is a hydrolysis process carried out with agitation, at atmospheric pressure, and in a basic aqueous medium utilizing an aqueous solution of sodium hydroxide. The concentration of sodium hydroxide in conditioner 12 is about 0.5 to 1 weight percent, based on the dry weight of corn grit present. Conditioner temperature is maintained at about 180° F. to about 200° F., preferably at about 190° F. while the conditioner contents is agitated. The moisture content of corn grit in the conditioner is no more than about 15 weight percent, preferably about 14 weight percent. The residence time (space velocity) in the conditioner is selected to achieve a gelatinization level in the range of about 5 percent to about 25 percent, preferably about 15 percent. Conditioner residence time usually is in the range of about 10 seconds to about 30 seconds. Conditioner temperature as well as moisture level are adjusted by the introduction of steam, usually at 60–70 psig.

The corn grit moisture content in the extruder is maintained in the range of about 20 to about 25 weight percent, preferably about 22 weight percent. The extruder is operated at superatmospheric pressure and at a temperature in the range of about 150° F. to about 210° F. The extruder residence time usually is in the range of about 20 seconds to about 60 seconds.

Corn collets are extruded from the extruder 22 at an exit temperature in the range of about 200° F. to about 205° F. and at a moisture content reduced to about 9 to about 12 weight percent as a result of flashing off of the excess water as the ambient pressure returns to atmospheric. The extruded corn collets have a basic pH value, preferably in the pH range of about 9 to about 11, more preferably about 9.5.

In a typical process example, corn grit at a rate of about 6000 lbs/hr is fed to the conditioner together with an aqueous sodium hydroxide solution (about 1 wt-% NaOH) at a rate of 0.5 gallons per minute and steam (60–70 psig) at a rate of about 250 lbs/hr. The conditioner temperature is maintained at about 190° F., and the corn grit moisture content at about 14 weight percent by modulating the steam feed rate.

Partially hydrolyzed corn grit is then passed downstream to an extruder at about 190° F. Supplemental steam is fed to the extruder to raise the corn grit moisture content to about 22 weight percent while in the extruder. The corn grit residence time in the extruder is about 40 seconds.

Corn collects at a rate of about 6000 lbs/hr are extruded from the extruder at an exit temperature of about 210° F. and a moisture content of about 11 weight percent. The dextrin value of the corn grit exiting the extruder as corn collets is in the range of about 8 to about 10.

The extruded corn collets are cooled and dried at the cooling and drying station 50 to a moisture content of no more than about 9 weight percent for further processing into flour. Comminution to flour is achieved in a hammermill or the like size reduction apparatus. In a hammermill, a tip speed of at least 2,700 feet/second is desirable. A tip speed of about 2,800 feet/second is preferred.

The flour product from hammermill 70 is next passed to a sifter 82 where flour having particles passing through a 100-mesh sieve, U.S. Sieve Series, is recovered as final product, and oversize flour particles are recycled to the hammermill for further processing.

The forgoing description is intended as illustrative, but is not to be taken as limiting. Still other variants and processing conditions within the spirit and scope are possible, and will readily present themselves to those skilled in the art.

I claim:

1. A continuous process for producing corn collets which comprises the steps of
    (a) conditioning corn grit in a conditioner at atmospheric pressure with an aqueous sodium hydroxide solution in the presence of steam, at a temperature in the range of about 180° F. to about 200° F., and while maintaining a corn grit moisture content of no more than about 15 weight percent, for a time period sufficient to obtain a gelatinization level in the range of about 5 percent to about 25 percent;
    (b) thereafter passing the obtained, partially gelatinized corn grit through an extruder at superatmospheric pressure and a temperature in the range of about 150° F. to about 210° F. while maintaining corn grit moisture content in the range of about 20 weight percent to about 25 weight percent;
    (c) extruding cooked corn grit as corn collets from the extruder at an exit temperature in the range of about 200° F. to about 215° F. and a moisture content in the range of about 9 to about 12 weight percent.

2. The process in accordance with claim 1 wherein the conditioning is effected at a temperature of about 190° F. and a corn grit moisture content of about 14 weight percent.

3. The process in accordance with claim 1 wherein the partially gelatinized corn grit in the extruder has a corn grit moisture content of about 22 weight percent.

4. The process in accordance with claim 1 wherein the aqueous sodium hydroxide solution in the conditioner provides about 0.5 to about 1 weight percent sodium hydroxide, based on the dry weight of corn grit in the conditioner.

5. The process in accordance with claim 1 wherein the extruded corn collets have a basic pH value.

6. The process in accordance with claim 5 wherein the pH value of the extruded corn collets is in the range of about 9 to about 11.

7. The process in accordance with claim 5 wherein the pH value of the extruded corn collets is about 9.5.

8. The process in accordance with claim 1 wherein the extruded corn collets are cooled to ambient temperature and dried to a moisture content of no more than about 9 weight percent.

9. A continuous process for producing a corn-derived flour which comprises the steps of
   (a) conditioning corn grit at atmospheric pressure with a aqueous sodium hydroxide solution at a temperature in the range of about 180° F. to about 200° F. in the presence of steam, and while maintaining a milled corn moisture content of no more than about 15 weight percent, for a time period sufficient to obtain a gelatinization level of about 15 percent;
   (b) thereafter passing the obtained, partially cooked corn grit through an extruder at superatmospheric pressure and a temperature in the range of about 150° F. to about 210° F. while maintaining corn grit moisture content in the range of about 20 weight percent to about 25 weight percent and producing a dextrin value in the range of about 8 to about 10;
   (c) extruding corn collets from the extruder at an exit temperature in the range of about 200° F. to about 215° F. and a moisture content in the range of about 9 to about 12 weight percent;
   (d) cooling the discharged corn collets to ambient temperature and drying to a moisture content of no more than about 9 weight percent; and
   (e) comminuting the cooled and dried corn collets to a flour passing through a 100 mesh sieve, U.S. Sieve Series.

10. This process in accordance with claim 9 wherein the comminuting is carried out in a hammermill.

11. Corn collets produced in accordance with the process of claim 1.

12. Corn-derived flour produced in accordance with the process of claim 9.

* * * * *